INVENTOR
Francis C. Osborn.
BY Edward N. Pagelsen.
ATTORNEY

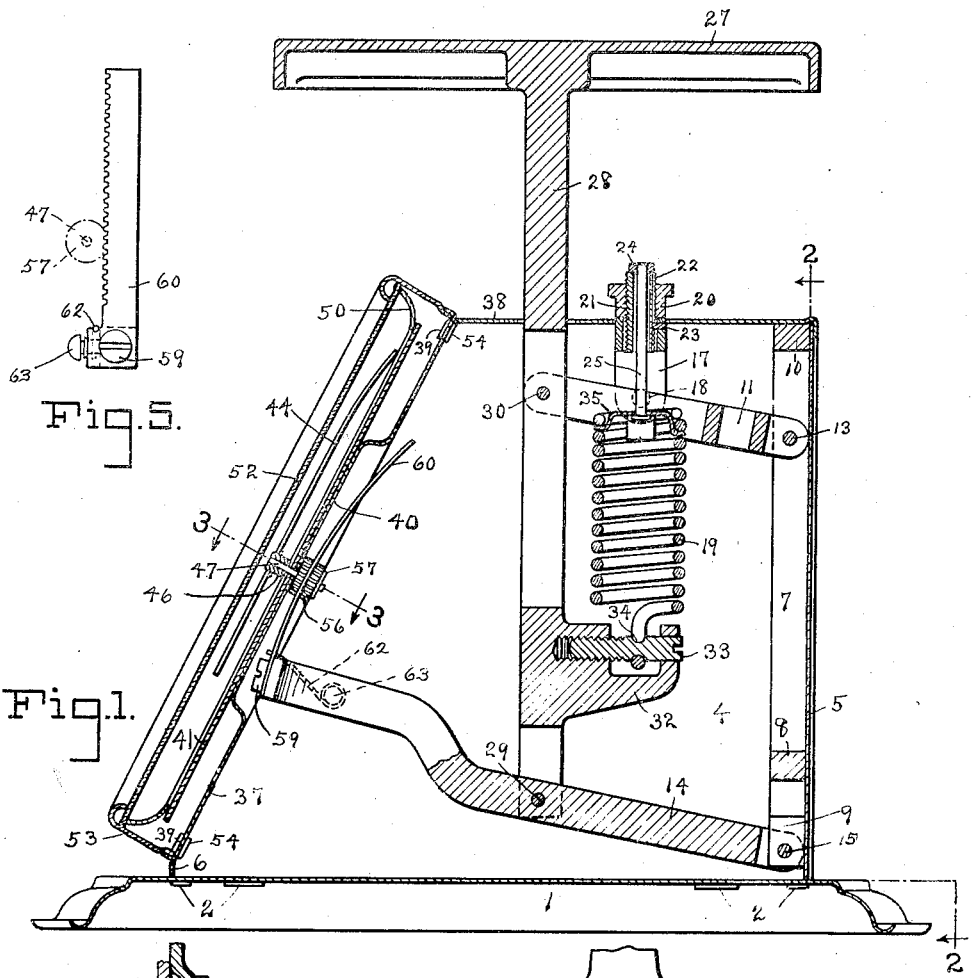
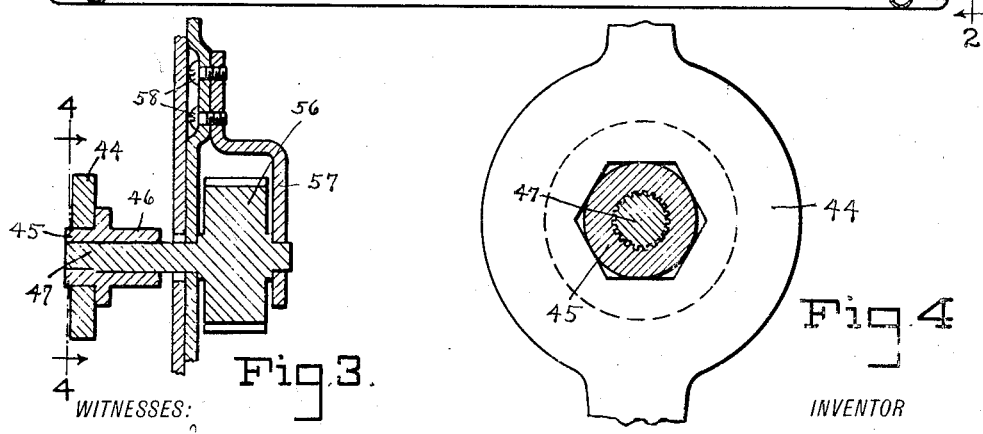

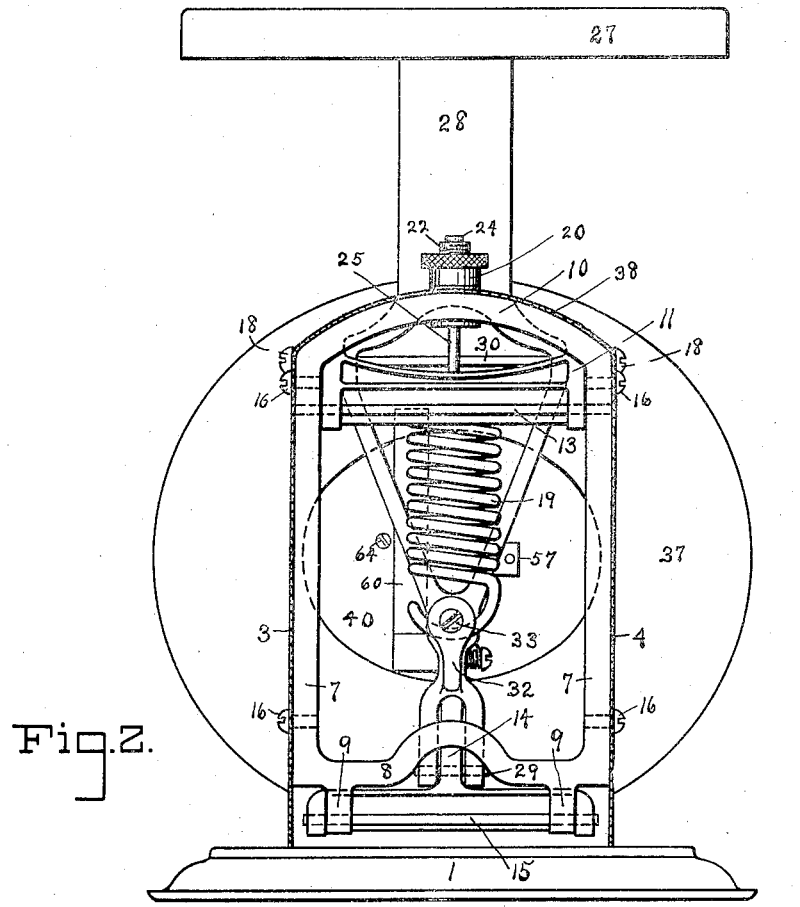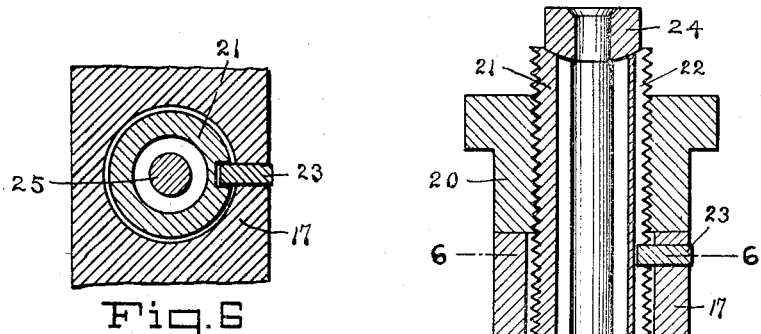

UNITED STATES PATENT OFFICE.

FRANCIS C. OSBORN, OF DETROIT, MICHIGAN.

SCALE.

1,289,885. Specification of Letters Patent. Patented Dec. 31, 1918.

Application filed February 17, 1913. Serial No. 748,813.

*To all whom it may concern:*

Be it known that I, FRANCIS C. OSBORN, a citizen of the United States, and a resident of Detroit, in the county of Wayne and State of Michigan, have invented a new and useful Scale, of which the following is a specification.

This invention relates to the construction of weighing scales in which the load is resisted by a spring and the weight of the load is indicated by a pointer moving over an inclined circular dial, and the object of this invention is to provide a novel connection between the lever mechanism of the scale and the indicating mechanism, which shall be simple, delicate, and adjustable and which can be constructed at low cost.

This invention consists, in combination with a case, a weight receiver having a downwardly extending stem, a lever to which the stem connects, and a spring between the case and stem, of a rack-plate secured to the end of the lever and bent to an arc having the pivot of the lever for its center and having teeth along one edge, a shaft having secured to it a gear meshing with the rack-plate, of a dial at right angles to said shaft, and an indicating hand secured in a novel manner to said shaft. It further consists in a novel device for suspending the spring from the top of the case and a novel device for connecting the spring to the load receiver.

Figure 8:
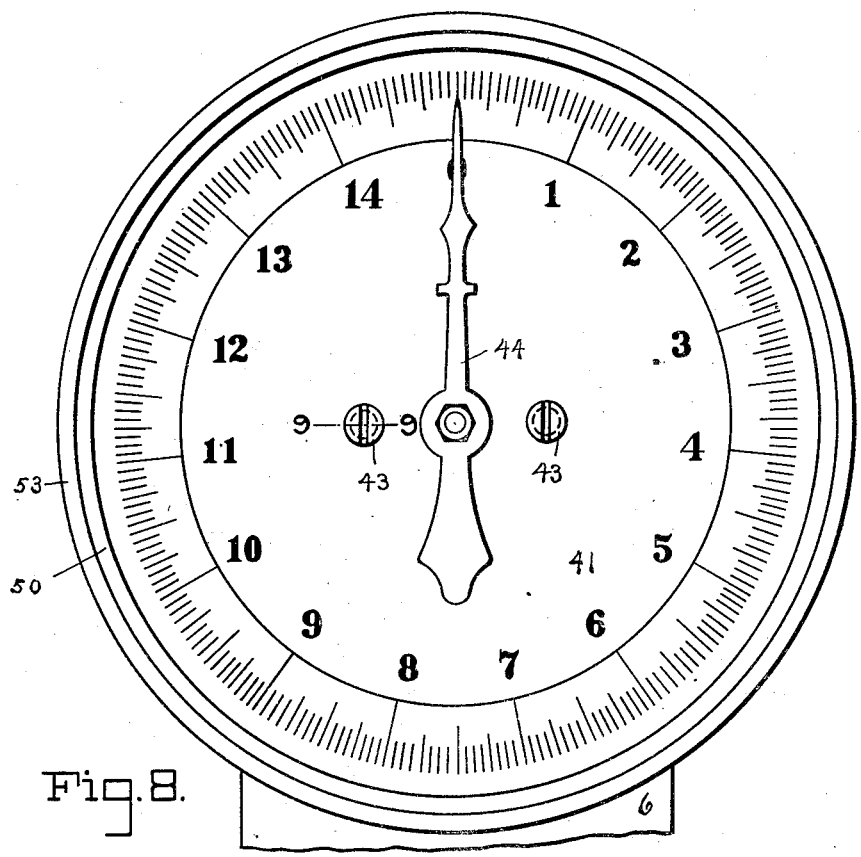
Figures 9, 10, 11:
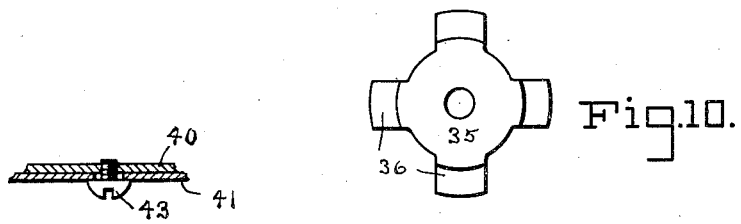

In the accompanying drawings, Figure 1 is a vertical, central section of this improved scale. Fig. 2 is a section on the line 2—2 of Fig. 1. Fig. 3 is a section on the line 3—3 of Fig. 1. Fig. 4 is a section on the line 4—4 of Fig. 3. Fig. 5 is an elevation of the curved rack-plate. Fig. 6 is a section on the line 6—6 of Fig. 7. Fig. 7 is an enlarged detail of a portion of Fig. 1. Fig. 8 is an elevation of the dial. Fig. 9 is a section on the line 9—9 of Fig. 8. Figs. 10 and 11 are views of the spring-supporting crab.

Similar reference characters refer to like parts throughout the several views.

The base and case of this scale are formed of sheet metal, the base 1 having slots through which extend the tongues 2 on the sides 3 and 4, back 5 and front cross-bar 6. The edges of the sides preferably lap over the back. A strong upright frame at the back of the case has side bars 7, lower cross bar 8 with lugs 9, and top bar 10. The guide link 11 is pivoted on the rod 13 carried by this frame, and the lever 14 is mounted on the rod 15 carried by the lugs 9. Screws 16 hold the frame in position.

Within the case is an arched-bar 17, held in position by screws 18, from which the spring 19 is suspended. As shown in Figs. 6 and 7, a screw-threaded sleeve 21 is mounted in the nut 20 and has a groove 22 into which the pin 23 carried by the arched-bar 17 extends. The upper end of this sleeve forms a seat for the collar 24 on the upper end of the rod 25. The adjacent faces of the collar 24 and the sleeve 21 are preferably spherical so that the rod 25 may swing with the spring.

The plate 27 is the load receiver and connects to the upper end of the stem 28, whose lower end connects to the lever 14 by means of a pivot 29, and to whose intermediate portion the link 11 connects by the rod 30. The stem 28 has an arm 32 and a screw 33 extends through this arm and is threaded into the stem. The space between the screw 33 and arm 32 is less than the diameter of the spring so it cannot escape from the groove 34. A groove 34 in this screw receives the lower bent end of the spring 19 so that the point of attachment of the spring to the stem can be accurately predetermined. The upper end of the spring is engaged by the crab 35 having fins 36 that extend between the wraps of the spring and which may be turned relative to the spring to adjust its length. This crab is mounted on the lower end of the rod 25.

A front plate 37, preferably circular, is secured to the top 38, the sides 3 and 4 and the front cross-bar 6 by means of tongues 39 passing through slots in this plate. The central portion 40 of this plate is pressed outward, as shown in Fig. 1, and the dial 41 is secured to it by means of screws 43. The holes in the dial and the heads of screws 43 are made large to permit the dial to be moved in any direction relative to the hand 44 (Fig. 9), in order to more readily seal the scale, that is, to adjust the graduations for variations in the action of the spring. This hand is preferably provided with a hexagonal hole into which a round portion 45 of the small sleeve 46 extends. The outer end of the bore of the sleeve is internally toothed to match the teeth on the outer end of the pintle 47, as shown in Fig. 4. The reason for this polygonal hole is that the end 45 of the sleeve can be easily riveted down to hold the hand in position, after which the sleeve and hand can be positioned on the pintle because of the interior teeth of the sleeve and exterior teeth of the pintle. The final adjustment between the hand and dial is made by the nut 20.

A ring 50, preferably pressed or spun out of sheet metal, rests against the dial 41 and supports the circular plate 52 of glass, which in turn is held in position by a second ring 53 of metal provided with tongues 54 that extend through the plate 37 and are then bent over. On the pintle 47 is the gear 56, and the inner end of the pintle is guided in a bracket 57, secured to the depressed portion 40 of the plate 37 by screws 58, as shown in Fig. 3. On the end of the lever 14 is the screw 59 on which is mounted the rack-plate 60, which is bent to a circular curve whose center is the pin 15. The rack-plate can swing on this screw and is held against the gear 56 by means of the spring 62 carried by the screw 63, as shown in Figs. 1 and 5. This spring, by pressing down on the rack-plate, prevents lost motion between the screw 59 and the rack-plate.

The stem 28 will always move parallel to its original position as the link 11 is of the same length as the load arm of the lever 14. The engagement of the rack-plate 60 with the gear will be constant because of the tension of the spring 62, but to make certain that the rack-plate shall not disengage because of any jars or jolts to which the scale may be subjected, the screw 64 may be mounted on the plate 37 just in the rear of the rack-plate, as shown in Fig. 2. It will be understood that the various adjusting means comprising the movement of the dial, the movement of the lower end of the spring and of the upper end of the suspending rod coöperate to produce a perfectly acting scale.

I claim.

1. In a weighing scale, the combination of a case, a lever, a weight receiver and a spring connected to said weight receiver, a front plate having an outward extending central portion, a dial adjustably secured thereto, a pintle extending through said dial and having a hand on its outer end and a gear on its inner end, and a rack-plate connected to said lever and engaging the gear so that the hand may be turned at the movement of the load receiver.

2. In a weighing scale, the combination of a case, a lever, a weight receiver and a spring connected to said weight receiver, a front plate, a dial adjustable eccentrically in all directions in its plane secured thereto, a pintle extending through said dial and having a hand on its outer end and a gear on its inner end, and a rack-plate connected to said lever and engaging the gear so that the hand may be turned at the movement of the load receiver.

3. In a weighing scale, the combination of a case, a weight receiver and a spring connected to said weight receiver, a front plate, a dial having a plurality of openings, screws of less diameter than said openings extending therethrough to adjustably secure the dial on the front plate, a pintle extending through said dial and having a hand on its outer end and a gear on its inner end, and a rack-plate engaging the gear so that the hand may be turned at the movement of the load receiver.

4. In a weighing scale, the combination of a case, a weight receiver, a spring connecting at its lower end to the weight receiver, a supporting rod extending upward from said spring, a collar on the upper end of said rod, a sleeve loosely surrounding the rod and supporting the collar, rod and spring, means to prevent the sleeve from turning, means to adjustably support said sleeve, and a weight indicator connected to said weight receiver.

5. In a weighing scale, the combination of a case, a weight receiver, a spring connecting at its lower end to the weight receiver, means to change the relative positions of the lower end of the spring and the weight receiver, a supporting rod loosely connected at its lower end to said spring and extending upwardly out of said case, a collar secured to the upper end of the rod, a threaded sleeve loosely surrounding the rod and supporting the collar, rod and spring, means to prevent the sleeve from turning, a nut on said sleeve and mounted on the case to adjustably support the sleeve, and a weight indicator connected to said load receiver.

6. In a weighing scale, the combination of a case, a weight receiver comprising a plate and a vertical stem, an adjustable screw mounted in said stem and having a groove, a spring suspended from the top of the case and having a hook at its lower end engaging in said groove and adapted to be laterally adjusted by said screw, and a weight indicator connected to said stem.

7. In a weight indicator, the combination of a case, a weight receiver mounted therein, a spring suspended from the top of the case, means connecting the lower end of the spring to the load receiver and adjustable to move said lower end toward and from the weight receiver, and a weight indicator connected to said load receiver.

8. In a weighing scale, the combination of a case, a load receiver, a spring suspended from said case, adjustable means for connecting the lower end of the spring to said load receiver and varying the relative positions of the lower end of the spring and the load receiver, a weight indicator comprising a dial and a hand, means connecting the hand and load receiver, and means to adjustably support the dial.

9. In a weighing scale, the combination of a case, a load receiver, a spring in said case, adjustable means for connecting the lower end of the spring to said load receiver and for varying the relative positions of the lower end of the spring and the load receiver, a weight indicator comprising a dial and a hand, means connecting the hand and load receiver, means adjustably supporting the dial, and vertically adjustable means for supporting the spring.

10. In a weighing scale, the combination of a case, a load receiver, a spring connected thereto to resist the load, a lever connected to the load receiver, a curved rack-plate extending upward from the end of the lever, a pivot carried by the lever on which the rack-plate is mounted, a pintle having an indicator and a gear connected to it, means to support the pintle, said rack-plate having a lateral projection at its lower end, and a spring mounted on the lever and pressing down on the projection on the rack-plate to hold the rack-plate against said gear and to hold the rack downward so as to act in conjunction with the force of gravity to prevent lost motion between the rack and lever.

11. In a weighing scale, the combination of a case, a lever, a load receiver, a spring to resist the load, a dial mounted on the case, a pintle extending through the dial and having its outer end longitudinally grooved to form regular teeth, means connecting the pintle and the lever, a hand having a polygonal hole, and a sleeve having a cylindrical end extending into the polygonal hole in the hand and having its outer end formed with interior teeth to fit the toothed end of the pintle so that the hand can be adjustably mounted thereon.

12. In a weighing scale, the combination of a case, a lever, a weight receiver and a spring connected to the weight receiver and case, a front plate, a dial secured to the plate, said dial being adjustable in all directions in its plane, a pintle revolubly mounted in the front plate, a hand thereon movable over the dial, and operative connections between the pintle and lever.

13. In a weighing scale, the combination of a case, a load receiver, a spring connected to the load receiver to resist the load, means for varying the effective working length of the spring, means for raising and lowering the spring and means for laterally varying the relation of the spring and the load receiver at their point of connection.

14. In a spring acting weighing scale comprising a case, a spring, a load receiver, a rotary weight indicator and a dial, means for adjusting the spring vertically, means for adjusting one end of the spring laterally with respect to the load, means for varying the length of the spring, and means for adjusting the dial in any direction in its plane.

15. In a weighing scale, the combination of a case, a load receiver, a spring to resist the load, a dial mounted in the case, a pintle extending through the dial and having its outer cylindrical end longitudinally grooved to form regular teeth, means connecting the pintle and the load receiver whereby the pintle is rotated by the load, a hand having a hole formed with interior teeth to fit the toothed end of the pintle so that the hand can be adjustably mounted thereon.

In testimony whereof I have signed this specification in the presence of two subscribing witnesses.

FRANCIS C. OSBORN.

Witnesses:
EDWARD N. PAGELSEN,
HUGO W. KREINBRING.